United States Patent [19]

Kelsey

[11] 4,080,406

[45] Mar. 21, 1978

[54] RUBBER-MODIFIED IMPACT POLYSTYRENES

[75] Inventor: Donald Ross Kelsey, Piscataway, N.J.

[73] Assignee: Union Carbide Corporation, New York, N.Y.

[21] Appl. No.: 676,128

[22] Filed: Apr. 12, 1976

[51] Int. Cl.² ............................................. C08F 279/06
[52] U.S. Cl. .............................................. 260/880 R
[58] Field of Search ........................ 260/880 R, 880 B

[56] References Cited

U.S. PATENT DOCUMENTS

| | | | |
|---|---|---|---|
| 3,359,345 | 12/1967 | Doak | 260/880 B |
| 3,400,175 | 9/1968 | Finestone | 260/880 R |
| 3,475,516 | 10/1969 | Bauer | 260/880 R |
| 3,914,337 | 10/1975 | Giddings | 260/880 R |
| 3,922,321 | 11/1975 | Yusa | 260/880 R |

*Primary Examiner*—Paul R. Michl
*Attorney, Agent, or Firm*—Gerald R. O'Brien, Jr.

[57] ABSTRACT

Polymeric styrene compositions having high optical transparency, impact strength and heat distortion temperature properties comprising the polymeric reaction product of:

A. 100 parts by weight of a monomeric mixture of:
  (1) about 25–75% vinyl aromatic monomer selected from the group consisting of substituted and unsubstituted styrenes;
  (2) about 5–70% methyl or ethyl methacrylate; and
  (3) about 5–60% of an alkyl methacrylate having at least four carbon atoms in the alkyl group; and B. about 2–30 parts by weight of a rubber selected from the group consisting of butadiene and a block copolymer of butadiene and styrene containing up to 50% by weight styrene.

16 Claims, No Drawings

RUBBER-MODIFIED IMPACT POLYSTYRENES

BACKGROUND OF THE INVENTION

The present invention relates to novel rubber-modified impact polystyrene compositions having high transparency, impact strength and heat distortion temperature properties.

While rubber-modified impact polystyrenes possess excellent impact strength properties, they do not possess the optical transparency which is desired for many use applications. The prior art has long sought to improve the optical transparency of rubber-modified impact polystyrenes without severely compromising the high impact properties which they inherently possess.

The employment of alkyl methacrylate as comonomer in the production of rubber-modified impact polystyrene has long been known. This modification, i.e., replacement of a portion of the styrene monomer with alkyl methacrylate, results in rubber-modified impact polystyrenes with improved optical transparency. However, such modification, while resulting in products having improved optical transparency and not greatly compromised impact strength properties, does result in reductions in heat distortion temperature properties.

SUMMARY OF THE INVENTION

It is the prime object of the present invention to overcome the difficulties set forth hereinabove by modification of rubber-modified polystyrenes to provide improved optical transparency properties without a corresponding reduction in impact strength and distortion temperature properties.

Specifically, it has been found that modification of rubber-modified impact polystyrenes by selected combinations of more than one alkyl methacrylate can provide products having improved properties, especially optical transparency (clarity) and heat distortion temperature, which cannot be obtained by modification with only one alkyl methacrylate.

More specifically, prior experimentation has shown that modification of rubber and styrene system (with lower alkyl methacrylate substitution for styrene) has resulted in a somewhat improved optical transparency. However, it has now been found that when a portion of the lower alkyl methacrylate is replaced by a higher alkyl methacrylate, the optical transparency of the product improves dramatically.

DETAILED DESCRIPTION

In accordance with the present invention, a novel polymeric styrene composition is provided having high optical transparency, impact strength and heat distortion temperature properties comprising the polymeric reaction product of:

A. 100 parts by weight of a monomeric mixture of
  (1) about 25–75% of at least one vinyl aromatic monomer selected from the group consisting of substituted and unsubstituted styrenes;
  (2) about 5–70% of at least one lower alkyl methacrylate selected from the group consisting of methyl and ethyl methacrylate; and
  (3) about 5–60% of at least one higher alkyl methacrylate having from four to 12 carbon atoms in the alkyl group; and
B. about 2–30 parts by weight of at least one rubber selected from the group consisting of polybutadiene and the block copolymers of butadiene and styrene containing up to 50% by weight styrene.

The polymerization mixture may also desirably include up to 50 parts by weight of inert solvent and up to 2.0 parts by weight of free radical initiator.

As employed herein, the term "inert solvent" has the usual and ordinary meaning of the art, namely, that the solvent does not homopolymerize or interfere with or react with the monomers employed under reaction conditions used.

Similarly, the term "free radical initiators" as employed herein is in keeping with the usual and ordinary meaning in the art of styrene polymerization. Specifically, the term would include the classes: azo-nitriles, azo derivatives, alkyl peroxides, acyl peroxides, hydroperoxides, ketone peroxides, peresters, peroxy carbonates, and the like. Examples of such free radical initiators are set forth in the section "Decomposition Rates of Organic Free Radical Initiators" in *Polymer Handbook*, John Wiley & Sons, New York (1975).

While the broad ranges of constitutents of the polymerization reaction mixtures of the present invention are as set forth hereinabove, the preferred ranges are as follows:

A. 100 parts by weight of a monomeric mixture of:
  (1) about 50–70% of at least one vinyl aromatic monomer selected from the group consisting of substituted and unsubstituted styrenes;
  (2) about 15–35% of at least one lower alkyl methacrylate selected from the group consisting of methyl and ethyl methacrylate; and
  (3) about 5–30% of a higher alkyl methacrylate having from four to 12 carbon atoms in the alkyl group; and
B. about 5–25 parts by weight of at least one rubber selected from the group consisting of polybutadiene and block copolymers of butadiene and styrene containing up to 50% by weight styrene.

The especially preferred composition of the invention is obtained employing unsubstituted styrene as the selected vinyl aromatic monomer, methyl methacrylate as the lower alkyl methacrylate, n-butyl methacrylate as the higher alkyl methacrylate and a block copolymer of butadiene and styrene as the selected rubber.

It has been found that α-methylstyrene may be employed to replace up to about 25% of the styrene as the vinyl aromatic monomer. Other aromatic monomers, such as p-vinyltoluene, may be used to replace up to all of the styrene as the vinyl aromatic monomer.

It has been found that the preferred weight ratio of the lower alkyl methacrylate to the higher alkyl methacrylate has been found to be from about 0.5 to 2.5. Broader ranges are, of course, operable within the scope of the present invention. In this general connection, it has been found that, if higher alkyl methacrylate modification is employed without any lower alkyl methacrylate, the optical transparency properties of the product may be somewhat improved but the heat distortion temperature properties are substantially reduced.

The modification (substitution of styrene) with alkyl acrylates and other olefinic monomers has not been found to be desirable, but is believed to be tolerable in minor amounts up to about 5%.

The preferred rubber (block copolymer of butadiene and styrene) may be replaced by polybutadiene and other equivalent rubbers.

In addition, lubricants, anti-oxidants, ultraviolet light stabilizers and other additives, all well known to the styrene polymer art, may be employed before and/or after polymerization.

The polymerization processes employable to produce the polymers of the present invention are all well known to the styrene polymer art and include the solvent process, the bulk process and the suspension or emulsion process. Each of these processes may be employed in the batch, semi-continuous or continuous embodiments.

EXAMPLES, CONTROL AND COMPARATIVE EXAMPLES

In the examples set forth below, unless otherwise stated, the polymerization of the reaction mixture is carried out under batch and/or continuous process conditions in a two stage reaction process with reaction preferably at 80°–150° C. through about 80% monomer conversion to polymer and at 130°–250° C. for the remaining conversion to about 95–99% monomer conversion. Inert solvent and unreacted monomer, if any, are distilled off at above 150° C. with or without reduced pressure.

EXAMPLE 1

A block copolymer rubber of butadiene-styrene (90 gram) (75/25 wt. ratio butadiene/styrene; Solprene 1205) was placed in a resin kettle equipped with a stainless steel motorized stirrer, a condenser, a thermometer, an argon gas inlet, and a drying tube on the condenser. Methyl methacrylate (76.5 gm), butyl methacrylate (127.5 gm) and styrene (306 gm), each of which had been separately passed through alumina to remove inhibitors and trace impurities, were added to the resin kettle and the mixture was stirred under argon atmosphere at room temperature until the rubber had dissolved to give a clear, somewhat viscous solution. Di-t-butyl peroxide (0.51 gm) was then added to the reaction solution. The stirred solution was heated in an oil bath to about 124° C. for 2 hours at which time the stirrer was removed from the very viscous partially polymerized mass. The thermometer was replaced with a thermocouple and heating was continued without agitation for 19 hours at an internal temperature of 130°–165° C. The temperature was then increased to 200°–210° C. for about 3 hours.

The cooled product was mixed on a two-roll mill at 170°–175° C. for 5 minutes, ground, and pressed into 20 mil and 120 mil films at about 4500 psi and 200° C. These clear, tough samples gave the following properties:

| | |
|---|---|
| Pendulum Impact (ft-lb/in$^3$) | 54 |
| Izod Impact (ft-lb/in notch; ASTM-D256-73) | 0.76 |
| Haze (%, ASTM-D1003-61) | 9 (20 mil) |
| | 9 (120 mil) |
| Transmission (%, ASTM-D1003-61) | 88 (20 mil) |
| | 83 (120 mil) |
| Heat Distortion Temperature (° C, 264 psi, ASTM-D648-72 on 120 mil) | 62 |

EXAMPLE 2

This example is a repeat of Example 1 except that the ratio of butyl and methyl methacrylate was changed to 127.5 gm methyl methacrylate and 76.5 gm butyl methacrylate along with 306 gm styrene and 90 gm butadiene-styrene block copolymer and 0.5 gm peroxide initiator. The polymerization and sample work-up essentially followed that given in Example 1. The compression molded samples showed

| | |
|---|---|
| Pendulum Impact | 67 |
| Izod Impact | 1.54 |
| Haze | 8% (20 mil) |
| | 16% (120 mil) |
| Transmission | 90% (20 mil) |
| | 81% (120 mil) |
| Heat Distortion Temperature | 67.8° C. |

EXAMPLE 3

This example illustrates the use of methyl methacrylate equal to the sum of the methyl methacrylate and butyl methacrylate used in Examples 1 and 2. Thus, the reactor was charged with butadiene-styrene block copolymer (90 gm), styrene (306 gm), methyl methacrylate (204 gm), and di-tert-butyl peroxide initiator (0.51 gm) and the mixture stirred to dissolve the rubber. The solution was then polymerized as given in Example 1 with the initial stage temperature before removing the stirrer held at about 115° C. (due to refluxing cooling action of the methacrylate). The milled, ground, and pressed product showed higher haze compared to those obtained in Examples 1 and 2, especially for the thick 120 mil placques, and higher heat distortion temperature:

| | |
|---|---|
| Pendulum Impact | 15 |
| Izod Impact | 0.78 |
| Haze | 21% (20 mil) |
| | 52% (120 mil) |
| Transmission | 88% (20 mil) |
| | 76% (120 mil) |
| Heat Distortion Temperature | 72° C. |

EXAMPLE 4

This example illustrates the effect of butyl methacrylate used in an amount equal to the sum of the methyl and butyl methacrylate used in Examples 1 and 2. Thus, when butadiene-styrene block copolymer (90 gm), styrene (306 gm), butyl methacrylate (204 gm), and di-tert-butyl peroxide (0.51 gm) were polymerized essentially as given in Example 1 and the product compression molded into 20 mil and 120 mil samples, the heat distortion temperature was low and the haze was somewhat higher than obtained in Examples 1 and 2:

| | |
|---|---|
| Haze | 13% (20 mil) |
| | 20% (120 mil) |
| Transmission | 90% (20 mil) |
| | 82% (120 mil) |
| Heat Distortion Temperature | 54° C. |

EXAMPLE 5

This example shows the effect of using a mixture of block copolymer rubber and polybutadiene rubber with the total butadiene content equivalent to that used in Example 1 and with the same styrene/methyl methacrylate/butyl methacrylate monomer ratios used in Example 1. About 25% of the butadiene is accounted for by the polybutadiene and the remaining 75% is accounted for by the block copolymer rubber.

Thus, polybutadiene rubber (16.9 gm); Firestone Diene 35 NFA) and the block copolymer rubber used in Example 1 (67.5 gm; Solprene 1205) were dissolved in a solution of styrene (309 gm), butyl methacrylate (129 gm) and methyl methacrylate (77.3 gm) with 0.52 gm di-tert-butyl peroxide. The polymerization, work-up, and sample preparation essentially followed that given in Example 1. The samples showed nearly the same clarity as for Examples 1 and 2:

| | |
|---|---|
| Pendulum Impact | 34 |
| Izod Impact | 0.80 |
| Haze | 6% (20 mil) |
| | 18% (120 mil) |
| Transmission | 89% (20 mil) |
| | 78% (120 mil) |
| Heat Distortion Temperature | 60° C. |

EXAMPLE 6

This example illustrates the use of polybutadiene rubber substituted for the block copolymer rubber of Example 2. Thus, 67.5 gm of polybutadiene rubber (Diene-35) was dissolved in a solution of 319.5 gm styrene, 80 butyl methacrylate and 133 gm methyl methacrylate and 0.5 gm t-butyl peroxide, and the polymerization and sample work-up were conducted essentially as given in Example 1. The compression molded product sample gave the following properties:

| | |
|---|---|
| Pendulum Impact | 83 |
| Izod Impact | 1.47 |
| Haze | 20% (20 mil) |
| | 71% (120 mil) |
| Transmission | 86% (20 mil) |
| | 63% (120 mil) |

EXAMPLE 7

This example illustrates the effect of methyl methacrylate equal to the sum of the methyl methacrylate and butyl methacrylate used in Example 6. Thus, 67.5 gm polybutadiene rubber was dissolved in 319.5 gm styrene, 213 gm methyl methacrylate, and 0.53 gm peroxide initiator added. The polymerization was conducted essentially as given in Example 3. The compression molded samples showed higher haze and lower light transmission compared to those obtained in Example 6.

| | |
|---|---|
| Izod Impact | 1.47 |
| Haze | 31% (20 mil) |
| | 82% (120 mil) |
| Transmission | 84% (20 mil) |
| | 56% (120 mil) |

Examples 6 and 7 illustrate that, although the product transparency is generally lower when only polybutadiene rubber is used, similar improvement in transparency is obtained when the combination of methyl and butyl methacrylate is used rather than methyl methacrylate alone.

Examples 8 – 10 illustrate the use of ethyl methacrylate in place of the methyl methacrylate used in Examples 1 – 3 or in place of the butyl methacrylate used in Examples 1, 2, and 4. The polymerizations were carried out essentially as given in the previous examples and Table I summarizes the properties found.

TABLE I

| | Composition (pbw)* | | | | | Haze, % | | Transmission, % | | Izod | Heat Distortion |
|---|---|---|---|---|---|---|---|---|---|---|---|
| Example | Rubber | MMA | EMA | BMA | Styrene | 20 mil | 120 mil | 20 mil | 120 mil | Impact | Temp. ° C. |
| 8 | 17.6 | | 30 | 10 | 60 | 7 | 12 | 89 | 84 | 0.9 | 62 |
| 9 | 17.6 | 20 | 20 | | 60 | 8 | 23 | 88 | 77 | 1.4 | 69 |
| 10 | 17.6 | | 40 | | 60 | 13 | 22 | 89 | 85 | 0.7 | 66 |
| 3 | 17.6 | 40 | | | 60 | 21 | 52 | 88 | 76 | 0.8 | 72 |
| 4 | 17.6 | | | 40 | 60 | 13 | 20 | 90 | 82 | 0.3 | 54 |

*Rubber is styrene/butadiene block copolymer used in Example 1; MMA = methyl methacrylate, EMA = ethyl methacrylate, BMA = butyl methacrylate. All runs used 0.1% t-butyl peroxide initiator (based on total monomer weight).

First, comparing Examples 8, 10, and 4 shows that the product from Example 8, where a portion of the ethyl methacrylate of Example 10 has been replaced by butyl methacrylate, has improved transparency (lower haze) over the products of Example 10 and Example 4 and also has a much improved heat distortion temperature over Example 4.

Secondly, comparing Examples 9, 10 and 3 shows that the product from Example 9, where a portion of the methyl methacrylate of Example 3 has been replaced by ethyl methacrylate, has greatly improved transparency over the product of Example 3. Compared to Example 10, the product from Example 9 shows a small improvement in transparency (lower haze) and an improved (higher) heat distortion temperature.

Examples 11 – 18 set forth in the following Table II, illustrate that similar results to those of Examples 1 – 5 are obtained when the polymerization is carried out in a continuous or partially continuous process and that the proportions of the components may be varied. Thus, a solution of the rubber dissolved in the proportion of monomers shown in Table II was metered continuously into the top of a reaction vessel equipped with a mechanical stirrer, argon bubbler, reflux condenser, and a variable speed screw-driven exit located at the bottom. The reaction temperature was adjusted by means of a circulating oil bath jacketing the reaction vessel and monitored with a thermocouple extending into the reaction mixture. The input and output rates were adjusted to maintain a constant reaction volume (about 400–800 ml) and a constant solids content (about 30–50%) at a constant reaction temperature of about 115°–130° C. This steady state was maintained until a total of 1.5–3 reaction volumes had been collected. A 400–600 gm product sample was then collected under argon atmosphere in a resin kettle and the polymerization and work-up of this sample was completed essentially as given in Examples 1 and 3.

TABLE II

| Example | Feed Composition (pbw)* | | | | Haze, % | | Transmission, % | | Izod Impact | Heat Distortion Temp. °C |
|---|---|---|---|---|---|---|---|---|---|---|
| | Rubber | MMA | BMA | Styrene | 20 mil | 120 mil | 20 mil | 120 mil | | |
| 11 | 17.6 | 20 | 25 | 55 | 7 | 15 | 88 | 81 | 1.5 | 63 |
| 12 | 17.6 | | 45 | 55 | 10 | 13 | 92 | 87 | 0.6 | 49 |
| 13 | 17.6 | 25 | 15 | 60 | 7 | 21 | 89 | 80 | 1.8 | 68 |
| 14 | 17.6 | 15 | 25 | 60 | 9 | 18 | 89 | 82 | 0.5 | 58 |
| 15 | 17.6 | 40 | | 60 | 20 | 67 | 85 | 72 | 0.8 | 71 |
| 16 | 17.6 | 20 | 15 | 65 | 8 | 15 | 87 | 76 | 0.9 | 71 |
| 17 | 17.6 | | 35 | 65 | 12 | 18 | 88 | 79 | 0.6 | 54 |
| 18 | 17.6 | 15 | 15 | 70 | 7 | 18 | 87 | 72 | 0.5 | 68 |

*See footnote TABLE I. Also all runs used 0.1% t-butyl peroxide (based on total monomer weight).

What is claimed is:

1. Polymeric styrene compositions having high optical transparency, impact strength and heat distortion temperature properties comprising the polymeric reaction product of:
   A. 100 parts by weight of a monomeric mixture of
      (1) about 25-75% of at least one vinyl aromatic monomer selected from the group consisting of substituted and unsubstituted styrenes;
      (2) about 5-70% of at least one lower alkyl methacrylate selected from the group consisting of methyl and ethyl methacrylate; and
      (3) about 5-60% of at least one higher alkyl methacrylate having from four to 12 carbon atoms in the alkyl group; and
   B. about 2-30 parts by weight of at least one rubber selected from the group consisting of polybutadiene and block copolymers of butadiene and styrene containing up to 50% by weight styrene.

2. The styrene composition in accordance with claim 1, wherein said selected vinyl aromatic monomer is unsubstituted styrene.

3. The styrene composition in accordance with claim 2 wherein said higher alkyl methacrylate is n-butyl methacrylate.

4. The styrene composition in accordance with claim 3, wherein said selected rubber is a block copolymer of butadiene and styrene containing up to 50% by weight styrene.

5. Polymeric styrene compositions having high optical transparency, impact strength and heat distortion temperature properties comprising the polymeric reaction product of:
   A. 100 parts by weight of a monomeric mixture of:
      (1) about 50-75% of at least one vinyl aromatic monomer selected from the group consisting of substituted and unsubstituted styrenes;
      (2) about 15-35% of at least one lower alkyl methacrylate selected from the group consisting of methyl and ethyl methacrylate; and
      (3) about 5-30% of a higher alkyl methacrylate having from four to twelve carbon atoms in the alkyl group; and
   B. about 5-25 parts by weight of at least one rubber selected from the group consisting of polybutadiene and block copolymers of butadiene and styrene containing up to 50% by weight styrene.

6. The styrene composition in accordance with claim 5, wherein said vinyl aromatic monomer is styrene.

7. The styrene composition in accordance with claim 6 wherein said higher alkyl methacrylate is n-butyl methacrylate.

8. The styrene composition in accordance with claim 7, wherein said selected rubber is a block copolymer of butadiene and styrene containing up to 50% by weight styrene.

9. Polymeric styrene compositions having high optical transparency, impact strength and heat distortion temperature properties comprising the polymeric reaction product of:
   A. 100 parts by weight of a monomeric mixture of:
      (1) about 25-75% of at least one vinyl aromatic monomer selected from the group consisting of substituted and unsubstituted styrenes;
      (2) about 5-70% of at least one lower alkyl methacrylate selected from the group consisting of methyl and ethyl methacrylate; and
      (3) about 5-60% of a higher alkyl methacrylate having from four to twelve carbon atoms in the alkyl group;
   B. about 2-30 parts by weight of at least one rubber selected from the group consisting of polybutadiene and block copolymers of butadiene and styrene containing up to 50% by weight styrene;
   C. up to 50 parts by weight of inert solvent; and
   D. up to 2.0 parts by weight of free radical initiator.

10. The styrene composition in accordance with claim 9 wherein said selected vinyl aromatic monomer is unsubstituted styrene.

11. The styrene composition in accordance with claim 10, wherein said higher alkyl methacrylate is n-butyl methacrylate.

12. The styrene composition in accordance with claim 11, wherein said selected rubber is a block copolymer of butadiene and styrene containing up to 50% by weight styrene.

13. Polymeric styrene compositions having high optical transparency, impact strength and heat distortion temperature properties comprising the polymeric reaction product of:
   A. 100 parts by weight of a monomeric mixture of:
      (1) about 50-70% of at least one vinyl aromatic monomer selected from the group consisting of substituted and unsubstituted styrenes;
      (2) about 15-35% of at least one lower alkyl methacrylate selected from the group consisting of methyl and ethyl methacrylate; and
      (3) about 5-30% of a higher methacrylate having from four to 12 carbon atoms in the alkyl group;
   B. about 5-25 parts by weight of at least one rubber selected from the group consisting of polybutadiene and block copolymers of butadiene and styrene containing up to 50% by weight styrene;
   C. up to 50 parts by weight of inert solvent; and
   D. up to 2.0 parts by weight of free radical initiator.

14. The styrene composition in accordance with claim 13, wherein said vinyl aromatic monomer is styrene.

15. The styrene composition in accordance with claim 14, wherein said higher alkyl methacrylate is n-butyl methacrylate.

16. The styrene composition in accordance with claim 15, wherein said selected rubber is a block copolymer of butadiene and styrene containing up to 50% by weight styrene.

* * * * *